United States Patent
Bayer et al.

(10) Patent No.: US 9,726,038 B2
(45) Date of Patent: Aug. 8, 2017

(54) METHOD OF PRODUCING AN INSULATION ELEMENT AND INSULATION ELEMENT FOR A HOUSING OF AN AERO ENGINE

(71) Applicant: MTU Aero Engines AG, Munich (DE)

(72) Inventors: Erwin Bayer, Dachau (DE); Thomas Hess, Munich (DE); Sven-Juergen Hiller, Erdweg (DE); Peter Geiger, Munich (DE)

(73) Assignee: MTU AERO ENGINES AG, Munich (DE)

( * ) Notice: Subject to any disclaimer, the term of this patent is extended or adjusted under 35 U.S.C. 154(b) by 447 days.

(21) Appl. No.: 14/328,829

(22) Filed: Jul. 11, 2014

(65) Prior Publication Data

US 2015/0016974 A1    Jan. 15, 2015

(30) Foreign Application Priority Data

Jul. 15, 2013 (DE) .................. 10 2013 213 834

(51) Int. Cl.
*F01D 25/14* (2006.01)
*F01D 25/00* (2006.01)
(Continued)

(52) U.S. Cl.
CPC ............ *F01D 25/145* (2013.01); *F01D 5/28* (2013.01); *F01D 5/284* (2013.01); *F01D 9/02* (2013.01);
(Continued)

(58) Field of Classification Search
CPC ...... F01D 25/145; F01D 5/284; F01D 25/005; F01D 25/12; F01D 25/14;
(Continued)

(56) References Cited

U.S. PATENT DOCUMENTS 3,432,314 A * 3/1969 Lynch ................... C04B 35/46
                                                  264/624
4,405,284 A * 9/1983 Albrecht ................. C23C 4/02
                                                  415/173.4
(Continued)

FOREIGN PATENT DOCUMENTS

DE        4121340 A1    1/1993
DE        4331060 C1    6/1994
(Continued)

OTHER PUBLICATIONS

Ceramic Industry, "A Binding Matter," Oct. 1, 2001. Available at http://www.ceramicindustry.com/articles/82746-a-binding-matter.*
(Continued)

*Primary Examiner* — Dwayne J White
*Assistant Examiner* — Peter T Hrubiec
(74) *Attorney, Agent, or Firm* — Abel Law Group, LLP (57) ABSTRACT

The invention relates to a process for producing an insulation element (12), which can be arranged radially above at least one guide vane (14) in a housing (10) of a thermal gas turbine. The insulation element (12) is produced from a solid body (24) provided with a metallic shell (26), the solid body (24) consisting at least partially of a ceramic material. The invention also relates to an insulation element (12), which can be arranged radially above at least one guide vane (14) in a housing (10) of a thermal gas turbine, and to an aero engine having a housing (10), in which at least one insulation element (12) is arranged radially above at least one guide vane (14).

10 Claims, 4 Drawing Sheets

(51) Int. Cl.
*F01D 9/02* (2006.01)
*F01D 5/28* (2006.01)
*F01D 9/04* (2006.01)
*F01D 11/00* (2006.01)
*F01D 25/24* (2006.01)

(52) U.S. Cl.
CPC ............... *F01D 9/04* (2013.01); *F01D 9/041* (2013.01); *F01D 9/042* (2013.01); *F01D 11/005* (2013.01); *F01D 25/005* (2013.01); *F01D 25/14* (2013.01); *F01D 25/24* (2013.01); *F05D 2260/231* (2013.01); *Y02T 50/675* (2013.01); *Y10T 29/49229* (2015.01)

(58) Field of Classification Search
CPC ........... F05D 2260/231; F05D 2230/21; F05D 2230/22; F05D 2230/31; F05D 2230/90; B23P 15/006
USPC .................................................... 415/9, 174.4
See application file for complete search history.

(56) References Cited

U.S. PATENT DOCUMENTS

| | | | |
|---|---|---|---|
| 4,646,810 A * | 3/1987 | Lardellier | B22D 25/00 164/114 |
| 5,074,749 A | 12/1991 | Fouillot et al. | |
| 5,195,868 A | 3/1993 | Plemmons et al. | |
| 5,336,542 A | 8/1994 | Wirth | |
| 5,662,457 A | 9/1997 | Bechtel et al. | |
| 8,157,507 B1 | 4/2012 | Coffin et al. | |
| 8,322,977 B2 * | 12/2012 | Beeck | F01D 11/005 415/139 |
| 9,169,741 B2 * | 10/2015 | Szwedowicz | F01D 11/18 |

FOREIGN PATENT DOCUMENTS

| | | |
|---|---|---|
| DE | 69408423 T2 | 6/1995 |
| EP | 0117388 A1 | 9/1984 |
| EP | 0522833 A1 | 1/1993 |
| EP | 0643208 A1 | 3/1995 |
| FR | 2957115 A1 | 9/2011 |
| GB | 2115487 A | 9/1983 |

OTHER PUBLICATIONS

Corbin, Khajepour, Toyserkani. "Laser Cladding," 2005. Available at https://books.google.com/books?id=zfybyCHzVqMC&pg=PA5&lpg=PA5&dq=laser+powder+cladding+benefits&source=bl&ots=vuvLCT4sWd&sig=cF6DS00n2Cbrm1YReoh1nnzwkVQ&hl=en&sa=X&ved=0ahUKEwjdh7LI-PPPAhUoilQKHevFCOM4ChDoAQhEMAk#v=onepage&q=laser%20powder%20cladding%20benefits&f=false.*

AZO Materials, Zirconia Machining Techniques—Process, Applications, and Benefits, Mar. 3, 2006. Available at http://www.azom.com/article.aspx?ArticleID=3272.*

* cited by examiner

METHOD OF PRODUCING AN INSULATION ELEMENT AND INSULATION ELEMENT FOR A HOUSING OF AN AERO ENGINE

BACKGROUND OF THE INVENTION

1. Field of the Invention

The invention relates to a process for producing an insulation element, to an insulation element for a housing of an aero engine and also to an aero engine having a housing, in which at least one such insulation element is arranged radially above a guide vane.

2. Discussion of Background Information

In turbines of turbomachines, for example aero engines or stationary gas turbines, very high temperatures at which the strength properties of the materials commonly used are greatly reduced prevail during operation in the turbine region, in particular in the annular space. This relates primarily to the housing of low-pressure turbines. In order to limit the temperatures in the region of the housing, which also has to undertake load-bearing tasks, to an acceptable range during operation of the associated turbomachine, various measures are known. By way of example, attempts are made to internally cool the housing by supplying secondary cooling air. The disadvantage of this solution consists in the high consumption of secondary air, which has to be withdrawn from the cycle and thus reduces the overall efficiency of the engine.

A further possibility consists in the external application of cooling air, for example with what is termed "Active Clearance Control" (ACC, "Cold Air Shower"), which controls the expansion behavior of the housing and therefore the radial clearances and reduces the material temperature of the housing. Disadvantages which are to be mentioned here are likewise the consumption of secondary air, but also the relatively minor ability to influence the effective material temperature and also the additional weight for the ACC and the required pipes.

It is commonly the case that insulation elements are arranged between guide vanes and the housing in order to ensure that the material temperature at the housing is reduced. These insulation elements generally consist of a thin sheet-metal jacket filled with swelling insulation material (for example a mineral substance). By way of example, EP 0 643 208 A1 discloses a thermal insulation arrangement, in which use is made of an insulation element made of a deformable metal foil which is filled with a thermal insulation material of a composite material mixture that increases its volume by up to 300% of its starting thickness when heated, such that the insulation element bears completely against the inner walls of an associated hollow space of the housing.

Through the configuration with a thin sheet-metal jacket, however, narrow limits are set for the shaping of the insulation element, as a result of which in some cases an optimum insulation action cannot be provided. In addition, as a result of the considerable changes in volume, the insulation element has a relatively low lifespan.

SUMMARY OF THE INVENTION

It is an object of the present invention to specify a process which makes it possible to produce an insulation element with an improved insulation action and a higher lifespan. Further objects of the invention are the provision of a correspondingly improved insulation element and also the provision of an aero engine having an insulation element improved in this way.

The objects of the invention are achieved by a process for producing an insulation element, by an insulation element and also by an aero engine as set forth in the appended claims.

A first aspect of the invention relates to a process for producing an insulation element, which can be arranged radially above at least one guide vane in a housing of a thermal gas turbine. In this case, it is provided according to the invention that the insulation element is produced from a solid body provided with a metallic shell, the solid body consisting at least partially of a ceramic material. In other words, it is provided according to the invention that, instead of a metal foil filled with an expandable material, a solid body is used as the insulation element, the solid body being surrounded by a metallic shell and consisting at least partially of a ceramic material. On account of the at least partial use of ceramic material or of different ceramic materials, the solid body undergoes at least approximately no change in volume or only an extremely small change in volume of at most ±10% even at high temperatures, for example at temperatures of between 900° C. and 1600° C. By way of example, the solid body can in principle have a proportion by weight of 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of ceramic material or of different ceramic materials. Owing to the fact that the ceramic solid body can be geometrically freely configured and on account of the fact that said ceramic solid body experiences no or only very small changes in volume in the event of temperature variations, the insulation element can be adapted optimally to the respective intended use and the conditions which prevail there, as a result of which a correspondingly high and reliable insulation action is achieved. In addition, the insulation element produced according to the invention has a particularly high lifespan, since it is not subjected to any significant fluctuations in volume even in the event of large variations in temperature.

In an advantageous embodiment of the invention, it is provided that the solid body is firstly produced from the at least one ceramic material and then enclosed with the metallic shell. This makes it possible to use different production processes for the solid body formed at least partially from ceramic and the metallic shell, as a result of which it is possible to optimally adapt the process to different material-specific requirements. In this case, it can be provided for example that the solid body serving as an insulation body is produced from a ceramic material and optionally sintered, after which the metallic shell is applied to the solid body, for example, by a generative process or by a coating process.

Further advantages arise if firstly part of the metallic shell is provided, is filled with the at least one ceramic material and, after the solid body has been formed from the at least one ceramic material, is completed. In other words, it is provided that firstly part of the metallic shell is produced and filled with the ceramic material from which the solid body is to be formed or is formed. By way of example, ceramic insulation material can be introduced into the partial shell in "loose" form (e.g. individual ceramic spheres). Furthermore, it can be provided that the metallic partial shell is filled with foam or filled with a ceramic powder and/or with further suitable materials. Then, the metallic shell is completed, that is to say that the material introduced into the partial shell is enclosed completely with the metallic material. Depending on the ceramic material used, a sintering step or the like can in principle also be provided if required before and/or after the completion of the metallic shell, in order to form the solid body enclosed by the metallic shell.

In a further advantageous embodiment of the invention, it is provided that the solid body is produced at least partially from a ceramic foam and/or from ceramic bodies, in particular ceramic spheres, and/or from ceramic powder and/or from ceramic sheets and/or by sintering and/or by the integral bonding of ceramic particles. As a result of this, the solid body can be produced in a particularly flexible manner and can be adapted optimally to the respective geometrical and thermal conditions in the associated engine. By way of example, individual ceramic bodies, for example ceramic spheres, can be provided and can be adhesively bonded to one another to produce the solid body. As an alternative or in addition, the solid body can be produced from a ceramic foam and/or from ceramic powder, at least the ceramic powder being sintered or integrally joined in a different way to form the solid body. As an alternative or in addition, ceramic bodies can be sintered by ceramic (nano)ceramic powder at a reduced sintering temperature (e.g. approximately 800° C.) to form a solid body. A further alternative is the use of a binding material, for example of an organometallic compound (lacquer), in which the organic residue is burned out and an integral bond is achieved via the metal. It can similarly be provided that the solid body is produced at least partially from ceramic sheets. In this case, what is termed a green body is produced from a plurality of plies of identical or different ceramic sheets. This green body is then sintered at suitable temperatures, for example at temperatures of between 800° C. and 1000° C. for what are termed Low Temperature Cofired Ceramics (LTCC) or at temperatures of between approximately 1500° C. and approximately 1800° C. for what are termed High Temperature Cofired Ceramics (HTCC). The ceramic sheets used for forming the green body can be produced, for example, by tape casting a ceramic green sheet on a support. In this case, the support is then removed from the ceramic green sheet, as a result of which an unsintered ceramic sheet is obtained. The ceramic sheets can be processed further, for example separated, before and/or after they are stacked. This affords the advantage that the solid body can have virtually any desired geometries, including undercuts and the like. In addition, a particularly effectively adapted insulation action can be achieved, for example, by the combination of different ceramic sheets. In addition, it is also possible to arrange further, possibly non-ceramic, materials, threads, fabrics and the like between the individual ceramic sheets.

In a further advantageous embodiment of the invention, it is provided that the at least one ceramic material is provided with an organic and/or organometallic and/or metallic and/or ceramic binder. This makes it easier to produce the solid body from granular or lumpy material.

Further advantages arise if the metallic shell is produced at least partially by a generative process, in particular by at least one process from the group of powder cladding and fused deposition modeling, and/or by a coating process, in particular by thermal spraying, and/or by primary shaping. This allows for a particularly flexible cladding of the solid body and therefore for a correspondingly flexible production of the insulation element. Particularly owing to a generative buildup of the metallic shell, there is more design flexibility compared to the conventional construction, since overlaps, undercuts and the like can also be produced. By way of example, it is thereby possible to produce insulation elements with overlapping segment abutment points and/or with structures at the segment abutment points which deform in such a way that they bear against other components in a gas-tight manner during operation. Furthermore, it is possible to produce insulation elements having component regions which exhibit a temperature-dependent bimetal effect. In other words, it is possible to produce auxetic structures having regions which thermally deform on one side.

A second aspect of the invention relates to an insulation element, which can be arranged radially above at least one guide vane in a housing of a thermal gas turbine. In this case, it is provided according to the invention that the insulation element consists of a solid body provided with a metallic shell, the solid body consisting at least partially of a ceramic material. As a result of this, the insulation element according to the invention has an improved insulation action and a higher lifespan. Further features and the advantages thereof can be gathered from the description of the first aspect of the invention, in which case advantageous embodiments of the first aspect of the invention are to be regarded as advantageous embodiments of the second aspect of the invention, and vice versa.

In an advantageous embodiment of the invention, the insulation element is configured in the form of segments, in particular in the form of ring segments. This makes it possible to line a housing of a thermal gas turbine in a particularly simple and gas-tight manner. In addition, the maintenance, reconditioning and repair of the insulation element are also made easier by a segment-like configuration.

Further advantages arise by virtue of the fact that the insulation element has segment abutment regions of complementary form lying opposite one another for the preferably annular arrangement of further insulation elements. In other words, the insulation element has opposing connection regions for the attachment of further insulation elements, the connection regions which are to be applied to one another having a complementary and preferably exchange-proof (foolproof) form so as to prevent incorrect assembly of individual segments.

In an advantageous embodiment of the invention, the insulation element comprises at least one sealing element for being arranged in a corresponding receptacle of an adjacent insulation element, the sealing element being formed in such a manner that it undergoes reversible and/or anisotropic deformation upon thermal loading. As a result of this, during the operation of an associated engine, a particularly high gas-tightness between adjoining insulation elements and therefore a particularly good insulation action and also an advantageously increased efficiency of the engine are ensured. The sealing element can be formed, for example, in such a manner that it exhibits a thermal bimetal effect. As an alternative or in addition, the sealing element can have an auxetic structure and thermally deform on one side.

Further advantages arise by virtue of the fact that the solid body and/or the metallic shell has or have regions which, at least in the mounted state of the insulation element, act as contact surfaces for further components and/or as mounting surfaces for arranging the insulation element on a housing and/or as abutment surfaces for the attachment of further insulation elements. In other words, it is provided according to the invention that the solid body and/or the metallic shell of the insulation element already has one or more functional surfaces from the group of contact surface, mounting surface and abutment surfaces at segment abutment points. This allows for a simplified arrangement and mounting of the insulation element in the housing and improves the insulation action. In addition, it is advantageously possible to dispense with further components for the attachment, mounting and/or connection of further insulation elements, as a result of which corresponding weight and cost savings are made.

A third aspect of the invention relates to an aero engine having a housing, in particular a low-pressure turbine housing, in which at least one insulation element is arranged radially above at least one guide vane. In this case, it is provided according to the invention that the insulation element is obtainable and/or obtained by a process according to the first aspect of the invention and/or is formed according to the second aspect of the invention. The features which arise herefrom and the advantages thereof can be gathered from the description of the first and of the second aspect of the invention, in which case advantageous embodiments of the first and of the second aspect of the invention are to be regarded as advantageous embodiments of the third aspect of the invention, and vice versa.

In an advantageous embodiment of the invention, it is provided that the aero engine comprises a plurality of segmented insulation elements, which are held annularly in the housing in relation to a rotor shaft of the aero engine. This makes it possible to line the housing of the aero engine in a particularly simple and gas-tight manner. In addition, the maintenance, reconditioning and repair of the housing and of the insulation elements are also made easier by a segment-like configuration.

Further advantages arise if the insulation elements have mutually corresponding segment abutment regions, each segment abutment region overlapping at least in certain regions with the respectively adjoining segment abutment region of the adjacent insulation element. This firstly achieves a particularly stable mechanical connection and secondly forms a type of labyrinth seal, as a result of which the insulation action and gas-tightness are further improved. As an alternative or in addition, it can be provided that the insulation elements each have two segment abutment regions lying opposite one another, of which a respective segment abutment region has a sealing element, which extends into a receptacle of the adjacent insulation element and undergoes deformation at least during the operation of the aero engine in such a manner that the passage of gas between adjacent segment abutment regions is at least largely reduced. This achieves both a high insulation action and a good tightness at the segment abutment points.

BRIEF DESCRIPTION OF THE DRAWINGS

Further features of the invention become apparent from the claims, the exemplary embodiments and also with reference to the drawings. The features and combinations of features mentioned in the description above and also the features and combinations of features mentioned in the exemplary embodiments below can be used not only in the combination indicated in each case but also in other combinations, without departing from the scope of the invention. In the drawings:

DETAILED DESCRIPTION OF THE INVENTION

Figure 1:
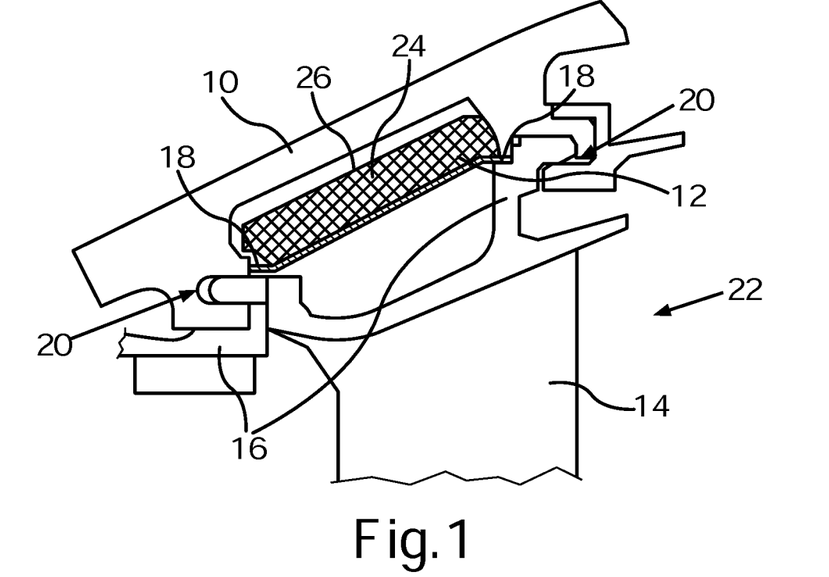
FIG. 1 shows a schematic lateral section of a housing for an aero engine, an insulation element being arranged in the housing radially above a guide vane.

FIG. 1 shows a schematic lateral section of a housing 10 for an aero engine (not shown). In turbines of aero engines, turbomachines, stationary gas turbines and the like, very high temperatures at which the strength properties of the materials used are greatly reduced prevail, in particular in the annular space 22 of the turbine region. This applies inter alia also to the housing 10 shown of a low-pressure turbine. To improve the insulation action, an insulation element 12 is arranged radially above a guide vane 14 in the housing 10 in relation to an axis of rotation of a rotor (not shown). The guide vane 14 is held on the housing 10 by way of hooks 16 in such a manner that the insulation element 12 is likewise secured in the corresponding receptacles 20 of the housing by way of its integrally formed mounting surfaces 18. During operation of the aero engine, the insulation element 12 improves the insulation between the guide vane 14 and the housing 10 and reduces the material temperature at the housing 10. Since the insulation element 12 furthermore rests on the housing 10, undesirable leakages are avoided entirely or at least largely during operation of the aero engine. On account of the at least substantially leakage-free connection, the insulation element 12 also improves the efficiency of the aero engine. It is to be emphasized, however, that the insulation element 12 can in principle also be used in other housing regions, for example in the region of rotor blades.

Figure 2:
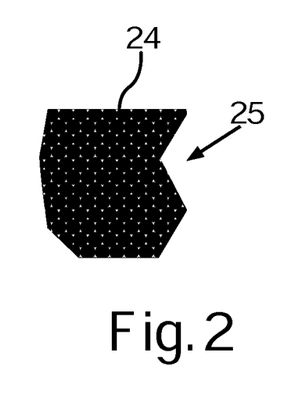
FIG. 2 shows a schematic lateral sectional view of a solid body at the start of the production thereof.
Figure 3:
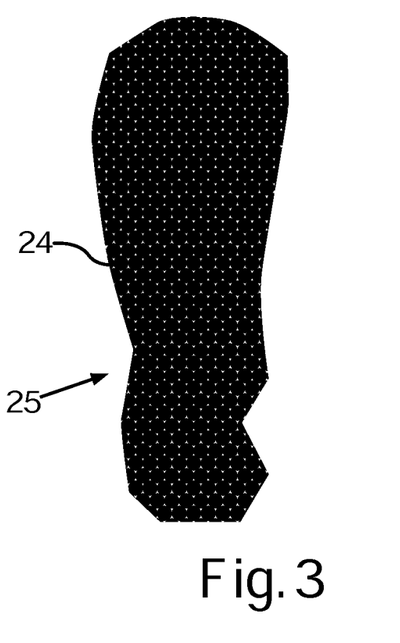
FIG. 3 shows a schematic lateral sectional view of the finished solid body of the insulation element.
Figure 4:
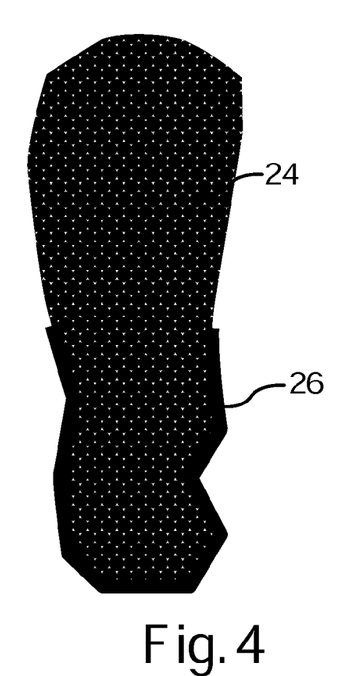
FIG. 4 shows a schematic lateral sectional view of the solid body as it is being enveloped with a metallic shell.
Figure 5:
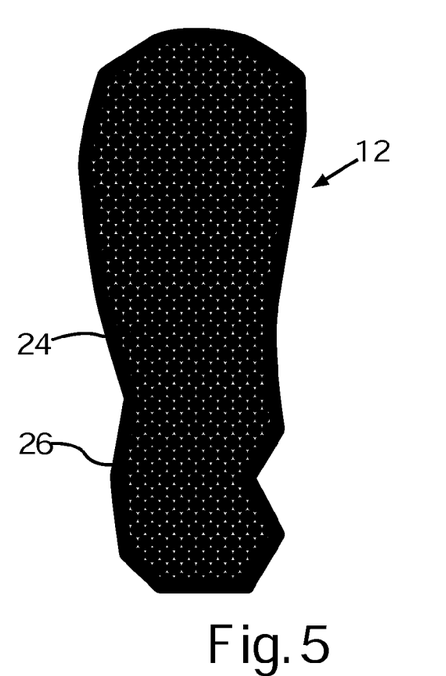
FIG. 5 shows a schematic lateral sectional view of the finished insulation element.

The insulation element 12 consists fundamentally at least of a solid body 24, which is provided with a metallic shell 26. The solid body 24 for its part consists at least partially of a ceramic material. There are various possible ways to produce the insulation element 12. FIGS. 2 to 5 firstly illustrate a sequential buildup of the insulation element 12 in more detail. In this respect, FIG. 2 shows a schematic lateral sectional view of a solid body 24 at the start of the production thereof. In the exemplary embodiment shown, the solid body 24 is produced from ceramic spheres 25, which are stacked in the desired geometrical shape. FIG. 3 shows a schematic lateral sectional view of the finished solid body 24 of the insulation element 12. The ceramic spheres 25 can be firmly bonded to one another, for example by a sintering operation, during and/or after the completion of the solid body 24. As an alternative or in addition, the solid body 24 can also contain ceramic foam or consist of ceramic foam. Then, the ceramic solid body 24 is enclosed with the metallic shell 26 by a generative process, for example by powder cladding, fused deposition modeling or the like, said metallic shell providing all the functional surfaces, for example contact surfaces, the already mentioned mounting surfaces 18, segment abutment regions 28 (cf. FIG. 7), and tightly surrounding the ceramic solid body 24. In this respect, FIG. 4 shows a schematic lateral sectional view of the solid body 24 as it is being enveloped with the metallic shell 26. FIG. 5, finally, shows a schematic lateral sectional view of the finished insulation element 12. Alternatively, it is possible to coat the already shaped ceramic solid body 24 with the metallic material, for example by thermal spraying, in order to thereby produce the metallic shell 26.

Figure 6:
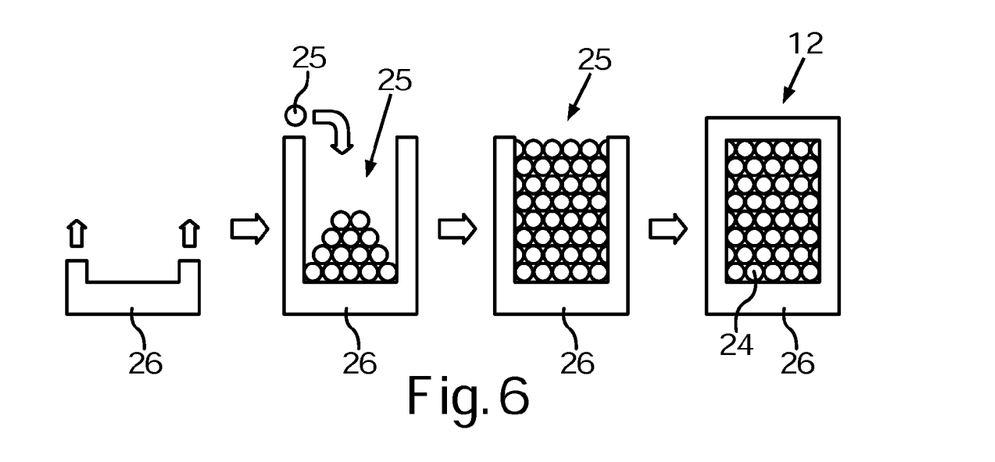
FIG. 6 shows a basic illustration of an alternative production process for the insulation element, in which four successive production phases are shown.

A further alternative possibility for producing the insulation element 12 is shown in FIG. 6. In this case, firstly part of the metallic shell 26 is produced, and this is then filled with ceramic material, for example with "loose" ceramic spheres 25. As an alternative or in addition to ceramic spheres 25, which are then adhesively bonded to one another, for example, the solid body 24 can also be produced from ceramic foam and/or from a sintered ceramic powder. As an alternative or in addition, the ceramic spheres 25 can be sintered, for example, by ceramic nanoceramic powder at a reduced sintering temperature (approximately 800° C.) to form the solid body 24. As a further alternative, the binding material used is an organometallic compound (lacquer), in which the organic residue is burned out and a bond is achieved between the ceramic spheres 25 via the metal. Finally, the solid body 24 is enveloped completely with the metallic shell 26, as a result of which the insulation element 12 is obtained.

Figure 7:
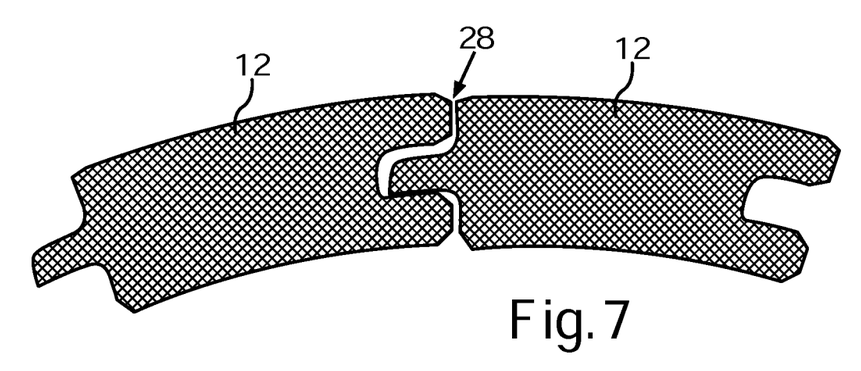
FIG. 7 shows a schematic lateral sectional view of two segment-shaped insulation elements.

Owing to the at least partial generative buildup, it is the case in principle that a greater design flexibility is achieved, compared to a conventional construction, particularly with respect to differently formed segment abutment regions 28 between insulation elements 12 bearing against one another. In this respect, FIG. 7 shows a schematic lateral sectional view of two segment-shaped insulation elements 12. The insulation elements 12 here are formed in a manner corresponding to one another, and therefore a plurality of insulation elements 12 can be arranged in an annular manner in the housing 10. It can furthermore be seen that the insulation elements 12 have abutment surfaces which overlap in the region of their segment abutment regions 28, as a result of which a high gas-tightness and also a stable mechanical connection are achieved.

Figure 8:
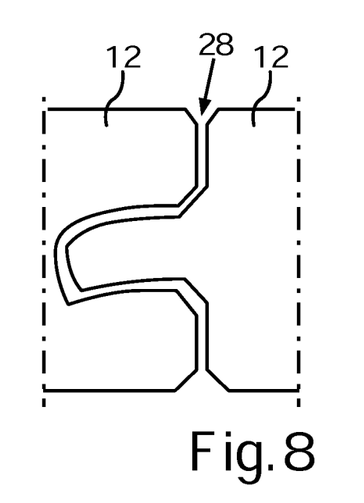
FIGS. 8 to 10 show schematic lateral sectional views of different embodiments of segment abutment regions, bearing against one another, of two insulation elements.
Figure 9:
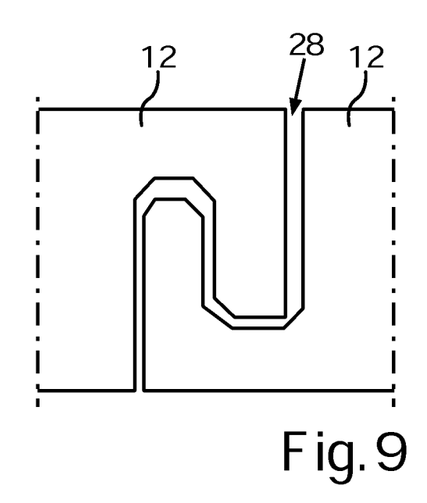
Figure 10:
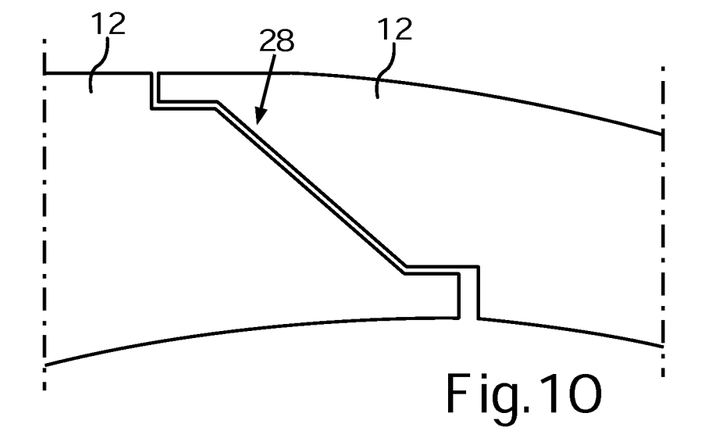

FIGS. 8 to 10 show schematic lateral sectional views of segment abutment regions, bearing against one another, of two insulation elements 12. It can be seen that a multiplicity of different geometrical configurations of the segment abutment regions 28 are possible, such that the insulation element 12 can be adapted optimally to its respective intended use.

Figure 11:
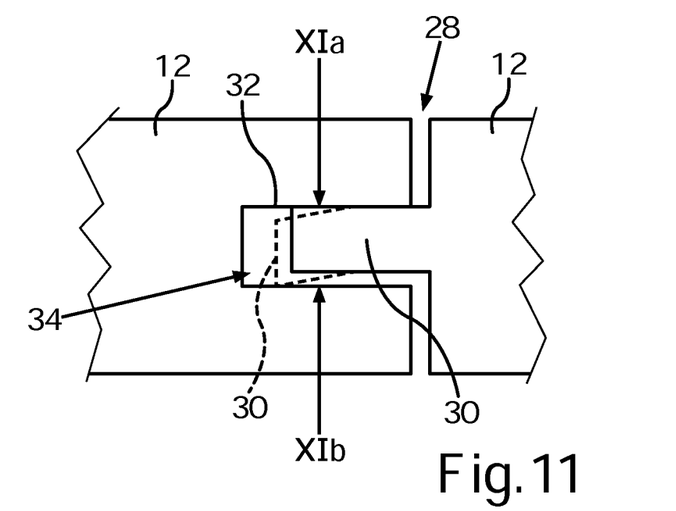
FIG. 11 shows a schematic lateral sectional view of a sealing element undergoing reversible deformation.

FIG. 11 shows a schematic lateral sectional view of a sealing element 30 undergoing reversible deformation. The sealing element 30 will be discussed as a representative of all structures in the segment abutment region 28 of adjacent insulation elements 12 which can undergo deformation in such a way that, during operation of an associated aero engine, they bear against the walls 32 of an associated receptacle 34 of the adjacent insulation element 12. To this end, the sealing element 30 can exhibit, for example, a type of bimetal effect and, as per arrow XIa, bear in the idle state only against the upper wall 32 of the receptacle 34 of the adjacent insulation element 12. During the operation of an associated aero engine, that is to say upon a large increase in temperature, the sealing element 30 undergoes deformation on one side, such that, as per arrow XIb, it bears both against the upper and against the lower wall 32 of the receptacle 34 of the adjacent insulation element 12. This operational state is indicated by dashed lines. In addition to a particularly good insulation action, this also achieves a particularly high tightness in the segment abutment region between the adjacent insulation elements 12. Upon subsequent cooling, that is to say for example when the aero engine is switched off, the sealing element 30 undergoes reversible deformation back into its idle state. This bimetal effect can be achieved, for example, by thermally asymmetrical shaping of the sealing element 30, i.e. by a configuration with regions which heat up at different speeds or to different extents, by the use of a bimetal, that is to say a shell 26 consisting at least in certain regions of different metals or metal layers, and/or by a refined material. All components or component elements with auxetic structures, that is to say with structures which undergo thermal deformation on one side, are suitable in principle for the functionality described.

The parameter values given in the documentation in order to define process and measurement conditions for characterizing specific properties of the subject matter of the invention are to be considered as encompassed by the scope of the invention even in the context of deviations—for example on account of measurement errors, system errors, weighing errors, DIN tolerances and the like.

What is claimed is:

1. An insulation element, wherein the element is configured to be capable of being arranged radially above at least one guide vane in a housing of a thermal gas turbine and consists of a solid body provided with a metallic shell, the solid body consisting at least partially of a ceramic material, and wherein the insulation element comprises at least one sealing element for being arranged in a corresponding receptacle of an adjacent insulation element, the at least one sealing element being formed in such a manner that it undergoes reversible and/or anisotropic deformation upon thermal loading.

2. The insulation element of claim 1, wherein at temperatures of from 900° C. to 1600° C. the solid body undergoes no change in volume or a change in volume of at most ±10%.

3. The insulation element of claim 1, wherein the insulation element is configured in the form of segments.

4. The insulation element of claim 3, wherein the segments comprise ring segments.

5. The insulation element of claim 1, wherein the element comprises segment abutment regions of complementary form lying opposite one another for an arrangement of further insulation elements.

6. The insulation element of claim 1, wherein the solid body and/or the metallic shell comprises regions which, at least in the mounted state of the insulation element, act as contact surfaces for further components and/or as mounting surfaces for arranging the insulation element on a housing and/or as abutment surfaces for an attachment of further insulation elements.

7. An aero engine, wherein the engine comprises a housing in which at least one insulation element is arranged radially above at least one guide vane, the at least one insulation element being the insulation element of claim 1.

8. The aero engine of claim 7, wherein the housing is a low-pressure turbine housing.

9. The aero engine of claim 8, wherein the aero engine comprises a plurality of segmented insulation elements which are held annularly in the housing in relation to a rotor shaft of the aero engine.

10. The aero engine of claim 9, wherein insulation elements have mutually corresponding segment abutment regions, each segment abutment region overlapping at least in certain regions with a respectively adjoining segment abutment region of an adjacent insulation element and/or wherein insulation elements each have two segment abutment regions lying opposite one another, of which a respective segment abutment region has a sealing element, which extends into a receptacle of an adjacent insulation element and undergoes deformation at least during an operation of the aero engine in such a manner that a passage of gas between adjacent segment abutment regions is at least reduced.

\* \* \* \* \*